July 27, 1965 G. W. CHENEY 3,196,592
MACHINE FOR MAKING AND FILLING BLOWN PLASTIC BOTTLES
Original Filed April 13, 1960 10 Sheets-Sheet 1

INVENTOR.
Grant W. Cheney

July 27, 1965   G. W. CHENEY   3,196,592
MACHINE FOR MAKING AND FILLING BLOWN PLASTIC BOTTLES
Original Filed April 13, 1960   10 Sheets-Sheet 6

INVENTOR.
Grant W. Cheney

INVENTOR.
Grant W. Cheney

United States Patent Office 3,196,592
Patented July 27, 1965

3,196,592
MACHINE FOR MAKING AND FILLING BLOWN PLASTIC BOTTLES
Grant W. Cheney, Midland, Mich., assignor to The Dow Chemical Company, Midland, Mich., a corporation of Delaware
Original application Apr. 13, 1960, Ser. No. 21,941. Divided and this application Apr. 10, 1964, Ser. No. 365,545
8 Claims. (Cl. 53—140)

This is a division of application Serial No. 21,941 filed April 13, 1960.

This invention relates to the thermoplastic bottle making art, and more particularly to a method and means for blow molding a thermoplastic bottle, filling the bottle with a liquid product, and capping the bottle after it has been filled, all such operations taking place in a single machine and in a single molding die without the need for moving the die until the entire cycle is completed.

The present invention utilizes the basic principles of the blow molding method set forth in the co-pending application, and in addition, discloses a method and means for filling the molded bottle with a liquid product, and capping the bottle after it has been filled, which method results in a very efficient and highly economical operation, since it eliminates many of the steps to produce such results as required in the methods of the prior art. In addition, one embodiment of the invention includes means which provide for aseptic handling of a product during filling operations.

Briefly, the method of the invention includes the following steps: (a) injecting a given amount of molten plastic material into a split type molding die to form a bottle neck portion, (b) injecting additional molten plastic material through the formed bottle neck portion to form a closed end parison, the wall of which is elongated as the closed end of the parison is being drawn away from the neck portion of the bottle, (c) cutting off flow of molten plastic material into the molding die, and simultaneously forming a finished edge about the bottle opening, (d) admitting compressed air into the parison to expand the wall thereof into engagement with the cavity of the molding die, (e) discontinuing flow of compressed air into the expanded parison and relieving the pressure therein, (f) filling the formed bottle with a liquid product, (g) capping the liquid filled bottle, and (h) removing the filled and capped bottle from the molding die.

The main object of this invention is to provide a highly efficient and economical method for making, filling, and capping a thermoplastic bottle.

A more specific object of this invention is to provide a method and means for making, filling, and capping a thermoplastic bottle, the steps of such an operation taking place in a single machine and without the need for moving the bottle from a molding die until after it is formed, filled, and capped.

Another object is to provide for aseptic handling of a product during bottle filling operations.

These and further objects and features of the invention will become more apparent from the following description and accompanying drawings wherein.

Figure 1:
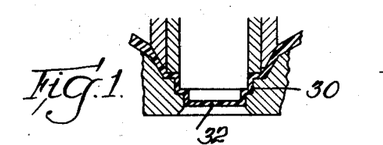
FIGS. 1 to 6 inclusive are schematic illustrations of the method of the invention, showing the steps of: (1) forming a bottle neck portion, (2) forming a closed end parison having an elongated wall, (3) blowing the parison wall into engagement with the die cavity, (4) filling the blown bottle with a liquid, (5) affixing a bottle cap to the end of a parison forming mandrel, and (6) capping the liquid filled bottle.
Figure 2:
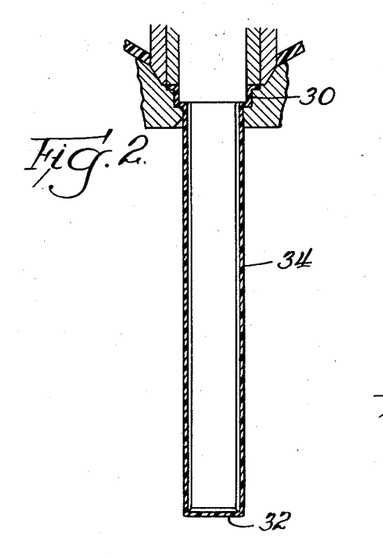
Figure 3:
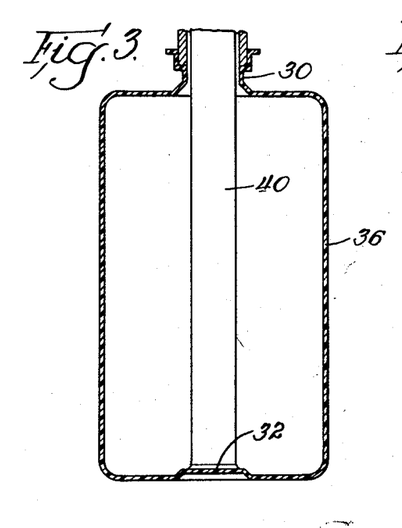
Figure 4:
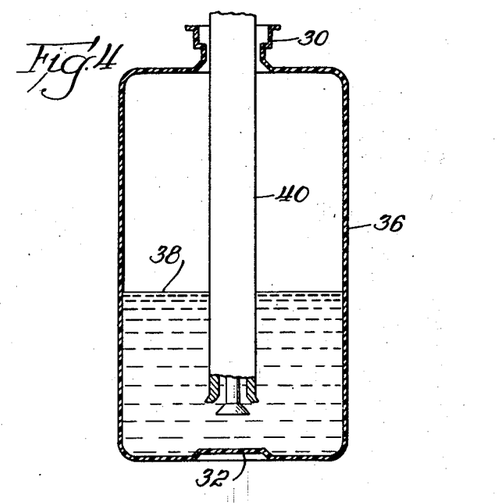
Figure 5:
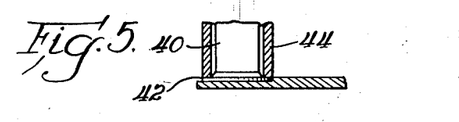
Figure 6:
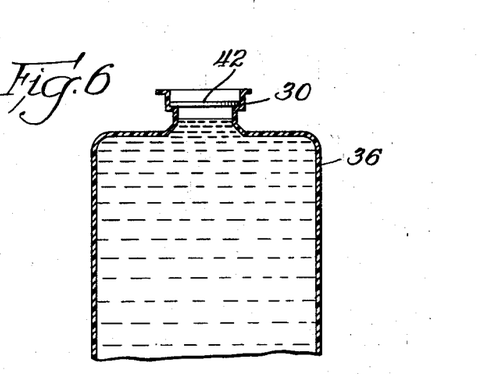

Referring now to the drawings, and more particularly to FIGS. 1 to 6 thereof wherein the method of the invention is clearly depicted, FIG. 1 shows the relative position of various parts of the apparatus, during formation of a neck portion 30 of a thermoplastic bottle, which neck portion at this phase of bottle formation includes a closed end 32, the latter of which will eventually become part of the bottle bottom. In FIG. 2, a closed end parison 34 is shown integral with the neck portion 30, the material for said parison having been ejected through the bottle neck portion 30. No further thermoplastic matrial is added to the potential bottle after the phase shown in FIG. 2 is completed. FIG. 3 illustrates formation of a thermoplastic bottle 36 by expanding the parison, by means of compressed air, into engagement with the walls of a cavity formed in a molding die and surrounding the parison 34. In FIG. 4 is illustrated a bottle filling operation which is accomplished by admission of a liquid 38 by way of a mandrel valve assembly 40. As the bottle is being filled, the mandrel valve assembly 40 is drawn upwardly, however, the lower end thereof is maintained below liquid level at all times during the filling so as to minimize, or eliminate foaming. In FIG. 5 the mandrel assembly is shown withdrawn from the bottle and in position to receive a bottle cap 42 maintained against the lower end thereof by application of a subatmospheric, or vacuum pressure. With the bottle cap so maintained, the mandrel assembly 40, together with a surrounding tube 44, is moved downwardly whereupon the bottle cap is seated in the neck portion 30 of the filled bottle. The cap 42 may be pressfitted into the bottle neck portion 30, or other holding means may be applied if desired. The foregoing briefly describes the method of the invention, which method provides for molding a finished bottle, filling the bottle, and capping the bottle, all of said steps taking place in one machine and without movement of the molding die until after the entire cycle of operations is completed. Such method not only results in highly efficient and high production operations, but in addition, minimizes product handling, and allows sanitary bottling procedures. Machinery, or apparatus, for practicing the method of the invention will now be described.

In FIGS. 7 to 11 inclusive, one type of machine or apparatus is shown for practicing the method of the invention. The apparatus incudes three vertically arranged posts, or columns 46 (two being shown) which are affixed in spaced relation to support a plurality of the yoke members, or straps 48, 50, 52, 54, 56, and 58. Yokes 48, 54, and 58 are all secured against vertical movement on the columns, while yokes 50, 52, and 56 are slidably arranged on the columns. A tie rod 60 is secured at the upper end by a pair of nuts 62 to the yoke 50, which tie rod extends downwardly and has formed thereon a pair of grooves, or recesses 64 and 66. Power operated means, preferably in the form of a double acting, air operated, cylinder and piston assemblage 68 and 70, are secured to the yokes 52 and 56 respectively. The power means 68 is arranged to move a finger, or latching member 72 into engagement with tie rod groove 64, while the power operated means 70 is arranged to move a finger, or latch means 74 into or out of engagement with the tie rod groove 66, at various times during the operating cycle of the apparatus, as will be more clearly seen hereinafter.

Figure 11:
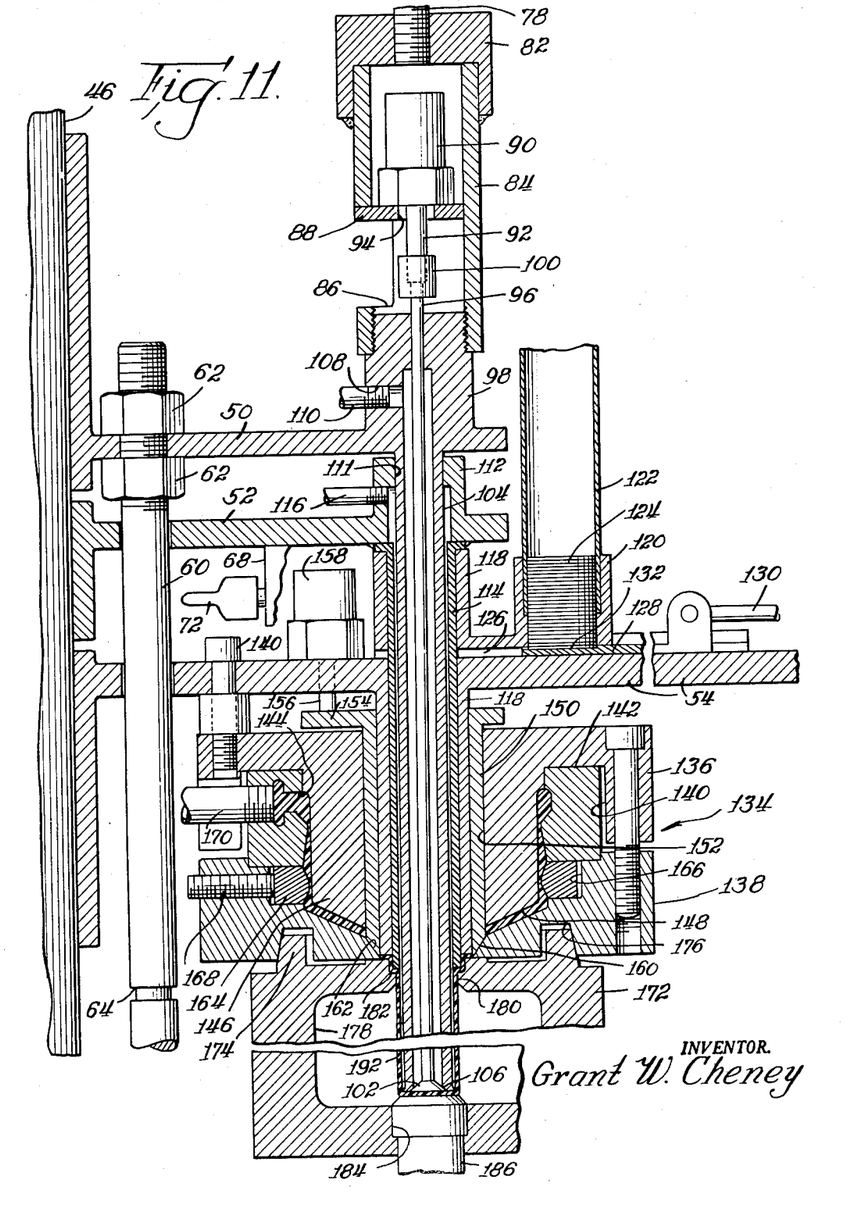
FIG. 11 is an enlarged section view generally as seen along line 11—11 in FIG. 8.

Affixed to the yoke 48 is a vertically arranged cylinder 76 in which is arranged a piston assemblage including a piston rod 78 extending downwardly through an opening 80 formed in the yoke 48. Pressure fluid means (not shown) are provided for causing reciprocal movement of the piston assemblage. The piston rod 78 threadably engages a cap member 82 which is secured to one end of a sleeve, or tube 84. As best seen in FIG. 11, the sleeve 84 has a side portion removed to form an opening 86, wherein a horizontal platform 88 is secured for the support of a cylinder 90 in which is slidably arranged a piston assemblage, including a piston rod 92 extending downwardly through a hole, or opening 94 formed in the platform 88.

Pressure fluid, such as compressed air, is fed to the cylinder 90 by pipe, or conduit means (not shown) whereby reciprocal movement of the piston assemblage and piston rod 92 is effected. A valve 96, in the form of an elongated rod, is slidably supported in a boss, or cylindrical protrusion 98 provided on the yoke 50, and has the upper end affixed to the piston rod 92 by a coupling means such as a sleeve, or nut 100, while at the lower end of the valve 96 is formed a tapered valve head 102. The sleeve 84 is threadably secured to the yoke boss 98 whereby reciprocal movement of the piston rod 78 will cause reciprocal movement of the yoke and the various parts coupled therewith. Affixed to the yoke 50 and extending downwardly therefrom, is an elongated tube, or sleeve 104 which functions as a mandrel, and in which the valve rod 96 is arranged. At the lower end of the mandrel 104 is a tapered surface 106 which forms a valve seat for the rod valve head 102. An opening 108 is arranged in the yoke boss 98 for receipt of a tube, or pipe 110 adapted to conduct a liquid product to the interior of the mandrel 104 for filling the bottle formed in the apparatus, as will be more clearly seen hereinafter. The mandrel 104 is slidably arranged in an opening 111 provided in a boss 112 formed on the yoke 52.

An elongated bushing, or sleeve 114 affixed for movement with the yoke 52 extends downwardly in spaced relation to the mandrel 104; pipe or tube means 116, secured to the boss 112, is arranged to conduct compressed air about the exterior surface of the mandrel 104 and downwardly through the sleeve 114. Such compressed air flow is utilized for expanding a closed end parison into engagement with the cavity of the molding die, and will more clearly appear hereinafter. The sleeve 114 is slidably arranged within a tubular protrusion 118 formed integral with the yoke 54 and projecting from opposite surfaces thereof. A second tubular protrusion 120 located parallel with and in spaced relation to the upper portion of the tubular protrusion 118, is arranged to receive a tube member 122 adapted for holding a supply of bottle cap elements 124. Slot means 126 arranged to extend between the tubular protrusions 118 and 120, and substantially in line with the upper surface of the yoke 54, is adapted to slidably receive a finger 128 reciprocally arranged and movable by means of a rod 130 attached to a motor means (not shown). The upper portion of the finger 128 is formed to provide a recess 132 adapted to receive one of the cap elements 124, for movement thereof into concentric position relative the center of the tubular protrusion 118. In such manner, a bottle cap is positioned in readiness for capping of a liquid filled bottle.

An extruding die, or head 134, which includes an upper die portion 136 and a lower die portion 138, is secured by fastening means such as bolts or cap screws 140, at the lower side of the yoke 54. The upper die portion 136 is provided with a circumferential recess 140 adapted to receive a plastic material distributor ring 142 the inner diameter of which is such dimension as to provide an enclosed circular opening or space 144 between the ring 142 and a cylindrical portion 146 of the upper die portion 136. The lower end of the cylindrical portion 146 is tapered for spaced parallel relation with a similarly tapered surface formed in the lower die portion 138, to provide a circumferential opening or space 148 connecting at the upper end with the opening 144. A sleeve valve 150 is slidably arranged within an opening 152 extending through the upper die portion 136, said sleeve valve also being slidably mounted on the tubular protrusion 118.

At the upper end of the sleeve valve 150 is a flange 154 to which is affixed a piston rod 156 of motor means 158 secured to the upper surface of the yoke 54. Means (not shown) are arranged to conduct pressure fluid, such as compressed air to the motor means 158 to thus provide reciprocal movement of the piston rod 156 and the sleeve valve 150. More than one such motor means 158 may be used in such manner if necessary. The lower end of the sleeve valve 150 has a taper 160 arranged to seat on a tapered valve seat 162 formed in the lower die portion 138. It will be seen that when the sleeve valve 150 is in downward position i.e., the taper end 160 being seated in the valve seat 162, the inner end of the space 148 is shut off, while when the sleeve valve 150 is in elevated, or upper position, the inner end of the space 148 is open. It will also be seen that cutoff, i.e., downward movement of the valve 150, will result in a smooth, or finished edge around the bottle opening formed in the molding die neck portion. A choke ring 164, arranged in a recess 166 formed in the lower die portion 138, is axially adjustable relative to the axis of the cylindrical portion 146 by means of a plurality of radially arranged set screws 168. In such manner, flow of molten plastic material, which is fed into the space 144 via a pipe, or hose means 170 secured to the distributor ring 142, may be directed for more even flow distribution into and out of the space 148.

A split type molding die 172 is arranged for engagement with the lower surface of the injecting die 134, and is formed with the guide flange 174 adapted to snugly engage a tapered wall of a recess 176 formed in the lower die portion 138. The molding die 172 is provided with a cavity 178, the walls of which are formed in the shape of a bottle to be blown or formed in the die. An opening 180 is provided in the upper wall of the molding die which opening has a shoulder 182 arranged in spaced relation to the lower extremity of the sleeve 114 when the latter is in lower position, as shown. A shouldered opening 184 is arranged in the lower wall surface of the molding die 172 and is adapted to slidably receive a plunger 186 the lower end of which is affixed to the yoke 56 for movement thereby. Means to position and maintain the molding die in engagement with the injecting die are provided but are not shown in the FIGS. 7 to 11 illustration; such means may be similar with that shown and described in a later discussed arrangement. A pressure fluid operated motor means, including a cylinder 188 having a piston assemblage with a piston rod 190, is arranged for reciprocating movement of the yoke 56.

The foregoing substantially completes the description of the apparatus which may be used for practicing the method of the invention; the operation of said apparatus for blow molding, filling and capping a bottle will now be described.

Figure 7:
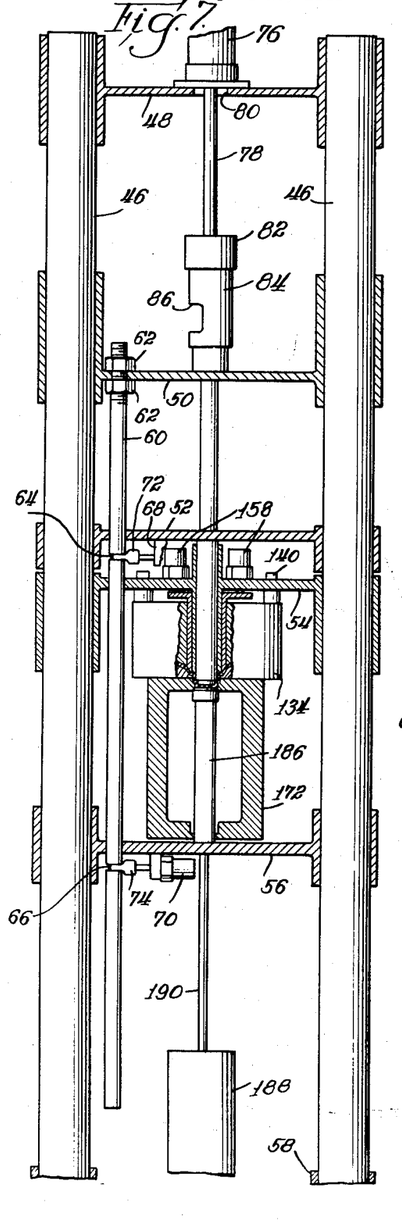
FIG. 7 is an elevation view partly in section, showing the relative position of various parts of a machine for practicing the method of the invention, and showing an initial phase of the molding operation.

Referring now to FIG. 7, the relative position of various parts of the apparatus during initial stage of a bottle molding operation, is illustrated. In such position, the molding die 172 has been brought into engagement with the injecting die 134, the yoke 56 has been moved upward under action of the piston rod 190 so that the plunger 186 is in engagement with the lower edge of the opening 180, and the sleeve valve 150 has been moved upwardly under action of the piston assemblages 158, so that molten plastic material will flow from the pipe 170 through spaces 144 and 148 (FIG. 11), past the taper portion 160 and tapered valve seat 162 into the opening 180, to form the neck portion of a thermoplastic bottle. As soon as the neck portion is formed the cycling mechanism of the apparatus (not shown) initiates operation of the power operated means 68 to cause withdrawal of the latch 72 from the tie rod groove 64, and subsequently causes operation of the cylinder and piston rod 190 so that the yoke 56 is moved downwardly. Downward movement of the yoke 56 results in withdrawal of the plunger 186 from the molding die. Simultaneously, such downward movement of yoke 56 causes downward movement of the tie rod 60 and the attached yoke 50, as well as downward movement of the yoke 52 by reason of engagement of finger 74 with the tie rod groove 66.

Figure 8:
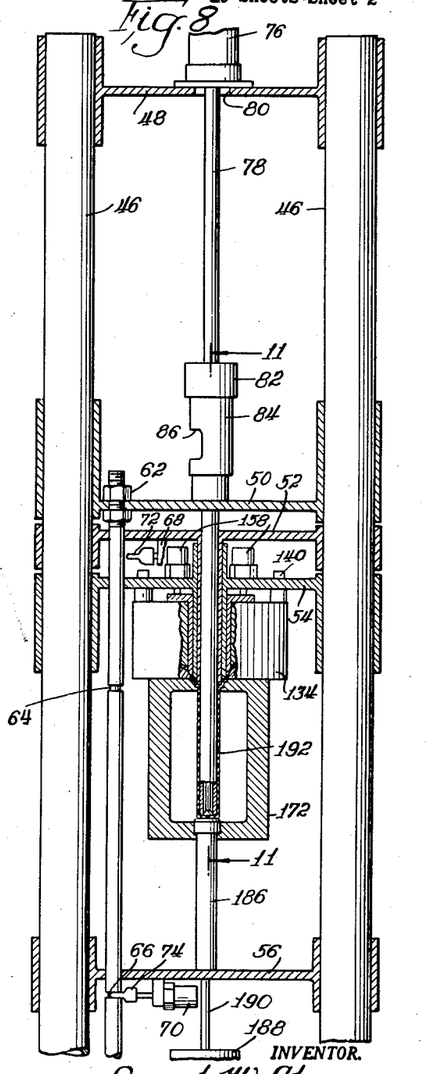
FIG. 8 is the same as FIG. 7, but showing the relative position of various parts upon completion of a closed end parison.
Figure 9:
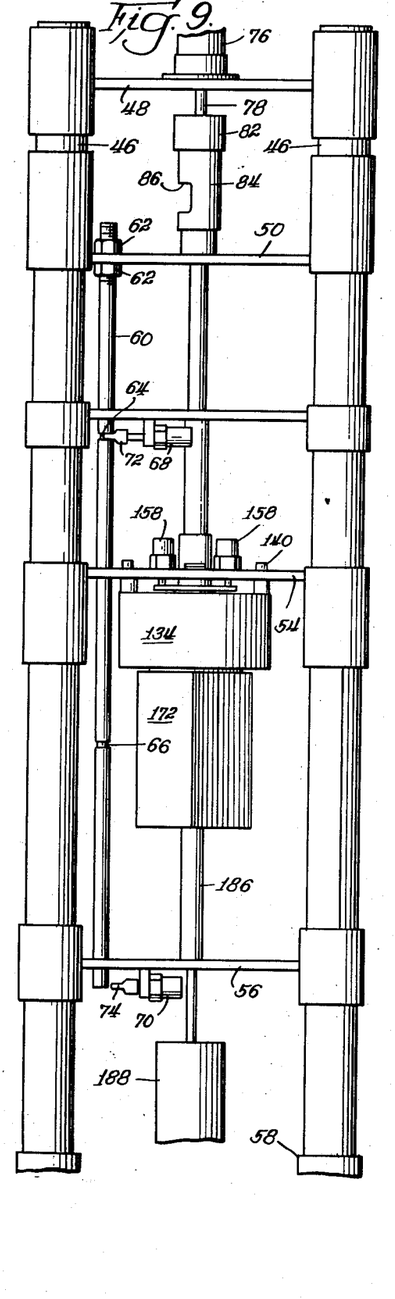
FIG. 9 is the same as FIG. 7, but showing the relative position of various parts at the time the closed end parison is blown into engagement with the wall of the molding die cavity.
Figure 10:
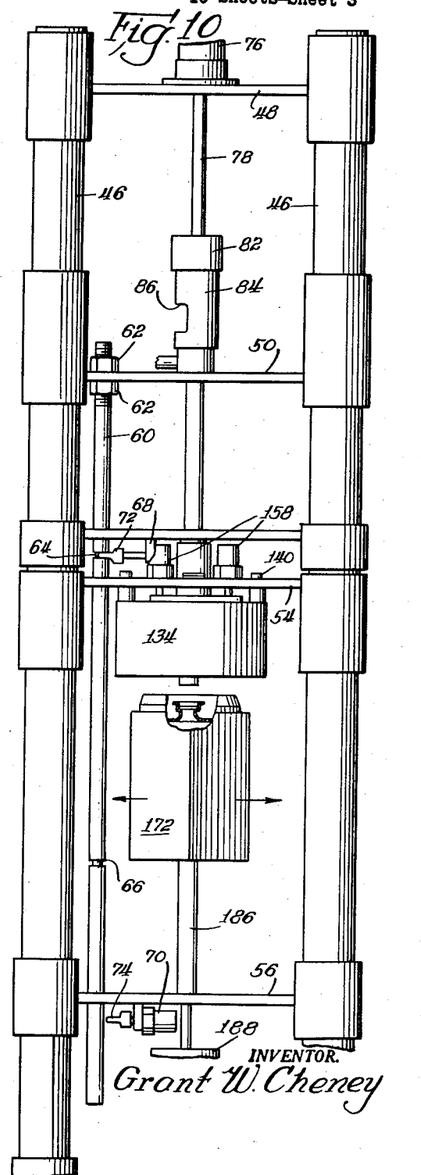
FIG. 10 is the same as FIG. 7, but showing the relative position of various parts after the molded bottle has been filled and capped and the molding die moved away from engagement with the injecting die.

Such downward movement of the yoke 50 results in downward movement of the mandrel 104 and the valve 96. During downward movemnet of the plunger 186 and the mandrel 104, molten plastic is fed through the molded bottle neck portion thus causing formation of an elongated parison 192 (FIG. 8). As the plunger 186 seats in the shoulder opening 184, the cycling mechanism of the apparatus operates to terminate such downward movement, and initiates operation of the piston assemblages 158 to cause downward movement of the sleeve valve 150, resulting in seating of the sleeve valve 150 upon the valve seat 162 to cut off flow of molten plastic material into the bottle neck portion. The apparatus cycling mechanism then initiates flow of compressed air in the pipe 116, which flows downwardly about the mandrel 104 and enters the parison 192, to expand it into engagement with the walls of the die cavity 178. As soon as the bottle is thus fully blown or expanded, the apparatus cycling mechanism discontinues air flow into pipe 116, and initiates operation of the cylinder 90 to unseat the valve head 102 from the mandrel valve seat 106. Simultaneously, the cycling mechanism causes operation of the power means 70 to move the finger 74 out of engagement with the tie rod groove 66, and initiates operation of the cylinder 76 to cause upward movement of the yoke 50 and the associated parts.

Upon initiation of upward movement of the yoke 50, the cycling mechanism operates to cause flow of a liquid product into the pipe 110, which flows downwardly within the mandrel 104 and past the unseated valve head 102 to enter the blown bottle. Flow of liquid into the blown bottle is regulated so that the level thereof is above the lower end of the mandrel 104, thus avoiding or minimizing foaming of the liquid product as it is fed into the bottle. As the mandrel 104 moves upwardly to clear the bottle opening, the power means 68 is activated so that the finger 72 can move into engagement with the tie rod groove 64 when the latter is moved into engaging position. Further upward movement of the yoke 50 results in upward movement of the yoke 52 whereby the sleeve 114 is simultaneously drawn upwards so that the end thereof clears the end of the bottle cap slot 126. When this occurs the apparatus cycling mechanism initiates inward movement of the bottle cap finger 128 to position a bottle cap within the opening of the tubular portion 118. The cycling mechanism of the apparatus next operates to cause sub-atmospheric or a vacuum pressure in the pipe 116 and in a space surrounding the tube 104, to thus maintain the bottle cap in position against the bottom end of the sleeve 114 and tube 104, as well as the end of the valve head 102. The cycling mechanism next initiates downward movement of the piston rod 78, resulting in downward movement of the yoke 50, integral sleeve 104, and yoke 52 which is coupled to the yoke 50 by engagement of the finger 72 with the tie rod groove 64; downward movement of the yoke 52 results in downward movement of the sleeve 114.

The downward movement of the parts mentioned results in placement of the bottle cap 124 into the neck portion of the molded bottle and the seating of the bottle cap upon the molded shoulder of the neck portion. Upon completion of such capping movement, the cycling mechanism of the apparatus initiates upward movement of the yokes 50 and 52, and associated parts 104, 96, and 114, whereby the lower ends of the associated parts clear the upper edge of the bottle neck portion. At this point the bottle molding, filling, and capping operation is completed. All that remains is for the removal of the molding die from engagement with the extruding die, following which the molding die is opened and the filled and capped bottle removed therefrom. Since, in the usual application the liquid contents of the bottle may be cold or cool, it will not be necessary to move the unopened die to a cooling station, as may be necessary when the bottle is not filled and capped in the same operation.

A second embodiment for practicing the method of the invention, illustrated in FIGS. 12 to 24 inclusive, is similar to that heretofore described, however, it differs in certain structural details therefrom, and does not include a bottle capping arrangement. For the sake of simplicity, the same numerals will be used for identification of elements in common with those in the first described embodiment.

Figure 12:
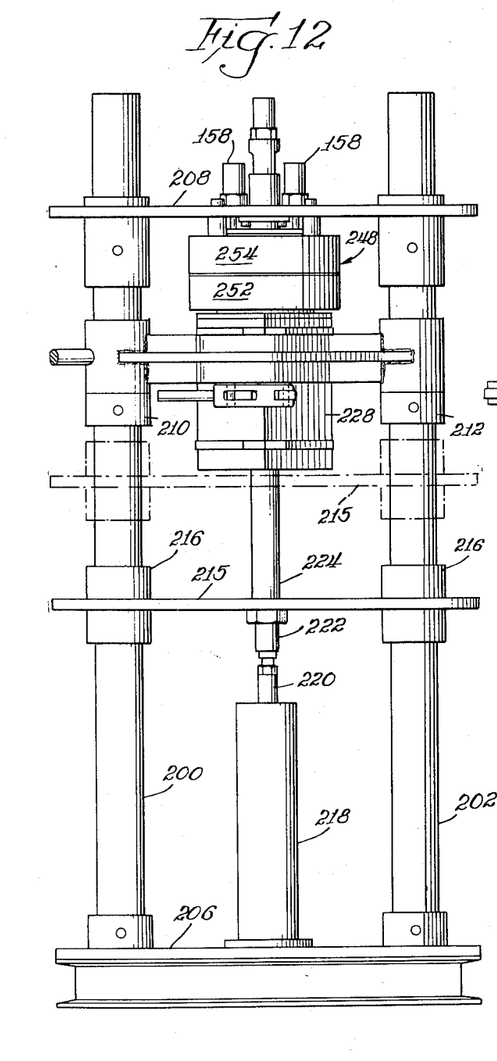
FIG. 12 is an elevation view of apparatus for practicing the method of the invention, which apparatus differs somewhat from that shown in FIGS. 7 to 11.
Figure 13:
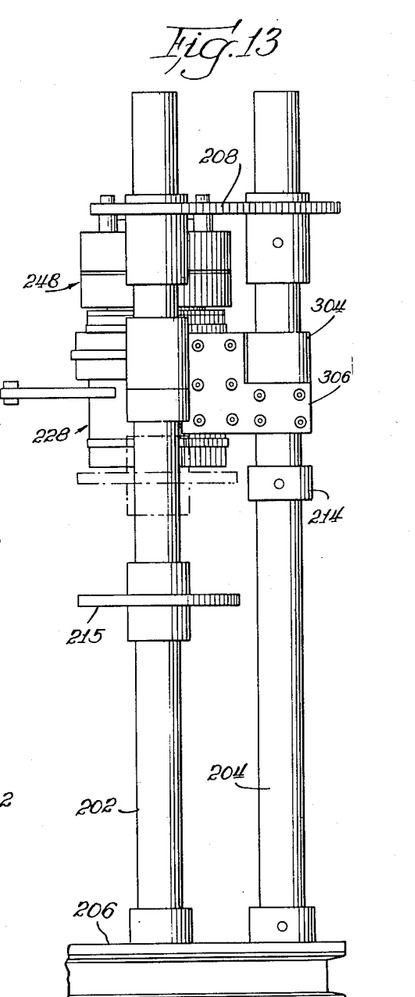
FIG. 13 is a side elevation view of the apparatus shown in FIG. 12.

Referring now more particularly to FIG. 12, a plurality of vertically arranged posts, or columns 200, 202, and 204 are fixed in parallel relationship upon a platform 206.

A yoke, or strap member 208 is affixed to the columns in a horizontal plane, while ring, or collar members 210, 212, and 214 are affixed to the column members 200, 202, and 204 respectively. A yoke, or strap 215 is arranged in a horizontal plane and has at each end a collar or bushing means 216 slidably mounted upon the columns 200 and 202. A vertically arranged cylinder 218 is secured at one end to the platform 206, and has a piston assemblage with a piston rod 220 projecting upwardly from the top end thereof. The piston rod 220 is attached by means of a shaft 222 to the platform 214 so that reciprocal movement of the piston rod 220 will cause reciprocal movement of the platform 215. Means (not shown) to conduct a pressure fluid to the cylinder 218 are provided. A plunger 224 is affixed to and extends upwardly from the platform 215 which plunger (FIG. 18) is slidably arranged in an opening 226 provided in a split-type molding die assemblage 228. The upper extremity of the plunger 224 is adapted to threadably receive a ring member 230 which engages a seat 232 formed at the lower edge of an opening 234, provided in the top portion of the molding die 228. The ring member 230 is arranged to maintain a porous wafer, or disc 236 on the upper end of the plunger 224, while the latter is formed to provide a passageway 238 extending the length thereof, and which is served by a tube, or hose means 240 to apply a vacuum, or sub-atmospheric pressure to the porous disc 236.

The molding die is of the split type having two halves 242 and 244 (FIG. 23) formed to provide a die cavity 246, the shape of which conforms to the exterior dimension of a bottle to be molded in the die. Passageway means 248 are provided in the bottom and top sections of the molding die, which passageways are served by tube, or pipe means 250 for circulating a cooling medium through the walls of the molding die. In this particular, it is to be noted that the upper portion of the molding die is so formed as to allow cooling medium to cool the region of the mold opening 234. For the sake of ease of manufacture, the molding die 228 has been illustrated as being made of several parts which are held together, for example by welding, however, the molding die may be fabricated by the use of different techniques, such as casting if desired.

Figures 18, 19, 20, 21, 22:
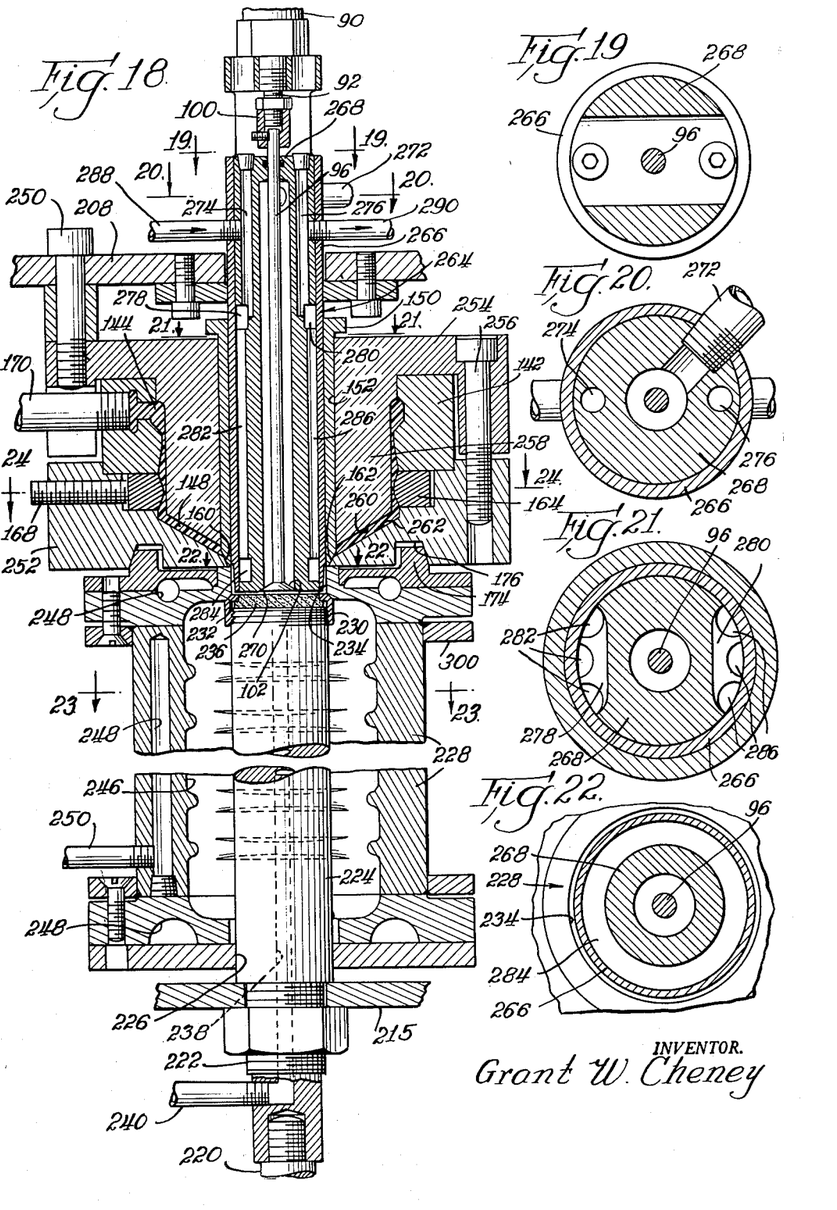
FIG. 18 is an enlarged vertical section view generally as seen along line 18—18 in FIG. 14.
FIG. 19 is a section view generally as seen along line 19—19 in FIG. 18.
FIG. 20 is a section view generally as seen along line 20—20 in FIG. 18.
FIG. 21 is a section view generally as seen along line 21—21 in FIG. 18.
FIG. 22 is a section view generally as seen along line 22—22 in FIG. 18.
Figure 23:
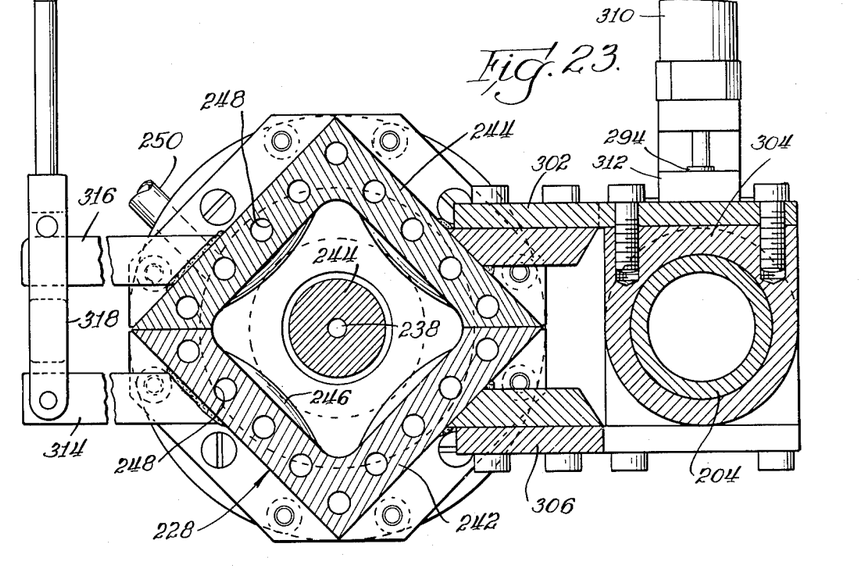
FIG. 23 is a section view generally as seen along line 23—23 in FIG. 18.
Figure 24:
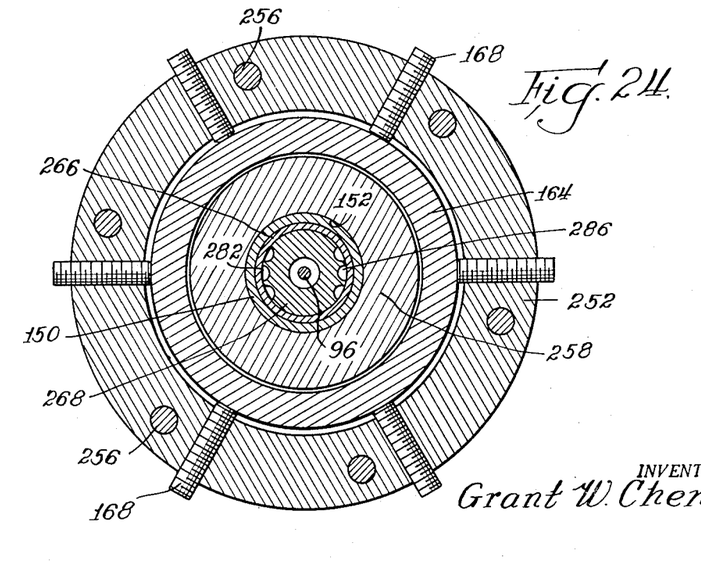
FIG. 24 is a section view generally as seen along line 24—24 in FIG. 18.

An extruding, or injecting die assembly 248 is secured to the yoke 208 by fastening means, such as bolts, or cap screws 250. The injecting die includes a lower die portion 252, and an upper die portion 254 which are held together by bolt, or cap screw means 256. The die assemblage 248 includes the distributor ring 142, the choke ring 164, and the set screws 168, all arranged in the same manner and for the same purpose as has been described in connection with the first apparatus embodiment. The upper die portion 254 includes a cylindrical portion 258, the lower end of which is tapered at 260 and in spaced relation to a taper 262 formed in the lower die portion 252, to provide the space 148 forming a passageway for conduction of molten plastic material during injecting operations. The sleeve valve 150 is slidably arranged in the opening 152 provided in the upper die portion, and is arranged so that the lower extremity thereof seats upon the edge of the opening 234 of the molding die when the sleeve valve 150 is in the plastic flow shut-off position (FIG. 18).

The piston assemblages 158, secured to the yoke 208 (FIG. 15), are arranged to provide reciprocal motion to the slide valve 150. A mandrel assembly 264, affixed to the yoke 208, extends downwardly through the sleeve valve 150, with its lower end in spaced relation to the walls of the molding die opening 234. The mandrel assembly includes a sleeve 266 which is affixed to a heavy walled tubular member 268 slidingly supporting the valve rod 96 at the upper end, which member 268 is formed with a valve seat 270 at the lower end for seating engagement by the valve head 102. A pipe, or tube 272 is arranged to conduct a pressurized medium into the tubular member 268 for flow past the valve head 102 during bottle blowing operations, as will be more clearly described hereinafter. Passageway means formed in the mandrel assembly 264, include a pair of passageways 274 and 276 extending downwardly and opening into recesses 278 and 280 respectively. A plurality of vertically arranged passageways 282 are arranged to open at the upper end into the recess 278 and to open at the lower end into a circumferential groove 284 formed upon the tubular member 268. Similarly arranged passageways 286 connect the recess 280 with the circumferential groove 284. An inlet tube, or pipe 288 is arranged to conduct a cooling medium into the passageway 274, while an outlet tube, or pipe 290 is arranged to conduct a cooling liquid out of the passageway 276.

It will be seen that cooling liquid flowing into passageway 274, passes downwardly into the recess 278, through the passageways 282 into the circumferential groove 284, upwardly through the passageways 286 into the recess 280 and then into the passage 276 for flow out of the mandrel assembly via the tube 290. In such manner, controlled cooling is provided to the mandrel assembly, and especially to the lower end thereof so that the molded bottle neck portion may be effectively cooled for set-up upon completion of the injecting process, and during the blowing of the parison, as will be described hereinafter. The cylinder 90 is affixed to an upper end of the tubular member 268, whereby the valve 96 may be moved as required during the bottle blowing phase of the molding operation.

The molding die 228 is held in injecting position against the extruding die, with molding die flange 174 engaging recess 176, by means of a gate arm, or strap 292, as well as a power operated latch, or finger 294. The arm 292 is pivotally mounted upon the column 202 and in abutment with the collar 212, while the other end of the gate arm is arranged to clasp the column 200. Handle means 296 are provided for rotating the gate arm into and out of die holding position. It will be seen that the gate arm is formed to provide a V shaped midsection 298 which conforms to the front and side walls of the molding die sections 242 and 244. The upper edge of the gate arm, in the region of the mid section 298, is arranged to slidably engage the lower surface of a flange means 300 provided on the molding die 228, when the latter is in injecting position and in engagement with the extruding die 248.

Figures 14, 15, 16, 17:
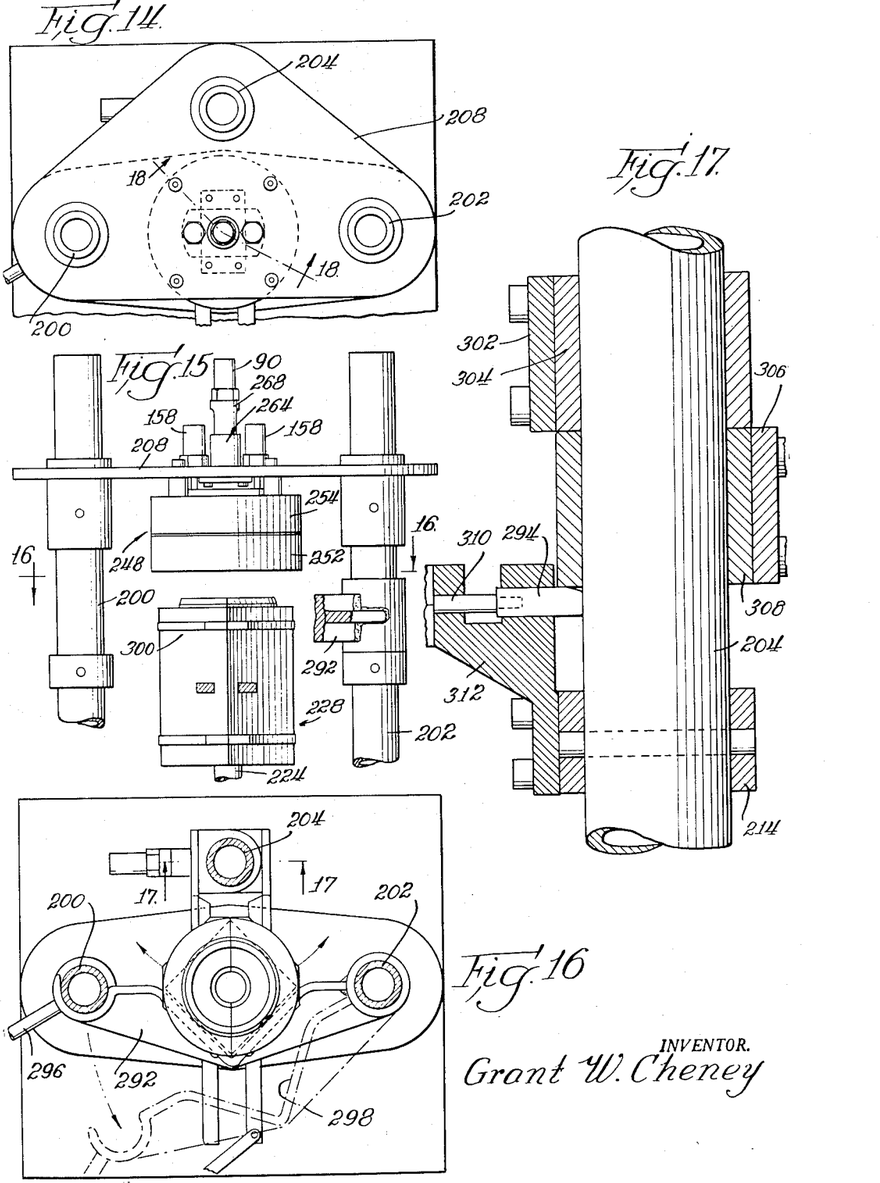
FIG. 14 is a view generally as seen along line 14—14 in FIG. 12.
FIG. 15 is a fragmentary elevation view of the apparatus of FIG. 12, and showing a molding die after it has been moved away from an engagement with an injecting head.
FIG. 16 is a view generally as seen along line 16—16 in FIG. 15.
FIG. 17 is an enlarged section view generally as seen along line 17—17 in FIG. 16.

A hinge means to provide opening of the split molding die 228 includes a strap 302 secured at one end to the molding die half 244, and at the other end to a block, or bushing 304 rotatably supported on the column 204. A similar strap 306 is affixed at one end to the molding die half 242 and at the other end to a block, or bushing 308 rotatably supported upon the column 204. The latch 294 is movable into engagement with the lower surface of the block 308 by means of a power operated cylinder and piston assemblage 310 supported by a bracket 312 secured to the collar 214 (FIG. 17). It will be seen that when the gate arm 292 is swung out of engagement with the lower surface of the flange 300, and the finger 294 is moved out of engagement with the lower surface of the block 308, the molding die asemblage 228 may be moved downwardly from engagement with the ejecting die 248, so that it may be swung open and a molded bottle removed therefrom. Locking means for holding the molding die halves 242 and 244 together, comprises a pair of arm means 314 and 316 affixed to the die halves 242 and 244 respectively, and a lever 318 pivoted at one end to the arm 314 and adapted to be swung into holding engagement with the arm 316.

The foregoing completes the description of the second embodiment of apparatus which may be used to practice the method of the invention. The main difference between the second embodiment and the first embodiment is the provision for cooling the molding die and the mandrel assembly of the extruding die, plus the fact that in the second embodiment no provision is made for capping a molded bottle after it is filled with a liquid product. The sequence of steps performed in the second described apparatus for molding and filling, is similar to that discussed in detail in connection with the first described embodiment, however, the pipe 272, which is used for conducting compressed air through the mandrel assembly for blowing the formed parison, may also be employed for conducting the liquid product into the blown bottle. Under certain conditions, it may be desirable to utilize the product (under pressure) for expanding the parison, in which case it would not be necessary to blow the bottle with compressed air, thus eliminating a step.

Cycling mechanism (not shown) is arranged to cause operation of the apparatus in the following manner: (a) after the molding die is closed and brought into engagement with the injecting die, the sleeve valve 150 is raised, allowing flow of molten plastic from the space 148 into the molding die opening 234, to form a bottle neck portion, (b) the plunger 224 is drawn downwardly while molten plastic material is fed through the neck portion of the bottle to form an elongated parison, (c) the sleeve valve 150 is moved downward to shut off flow of plastic material from the space 148, (d) the valve rod 96 is moved downwardly to unseat the valve at 102 and compressed air, carried in the pipe 272, flows into the parison and expands the wall thereof into engagement with the molding die cavity walls, (e) air flow is discontinued, (f) a liquid product, conducted by the pipe 272, is next fed into the blown bottle until the desired liquid level is reached, (g) the valve rod 96 is moved upwardly so that the valve head 102 seats upon the valve seat 270, and (h) the molding die is moved away from engagement with the ejecting die, and is opened to remove the blown and filled bottle. Obviously, the bottle filling operation may be eliminated so that the blown bottle may be removed from the die and filled at a later time if desired.

A third embodiment for practicing the method of the invention, illustrated in FIGS. 25 to 28 inclusive, is similar to the embodiments heretofore described, however, it differs in certain structural details therefrom, and among other things includes hermetical sealing means allowing sanitary handling of the product which the blown bottle will contain.

Figure 25:
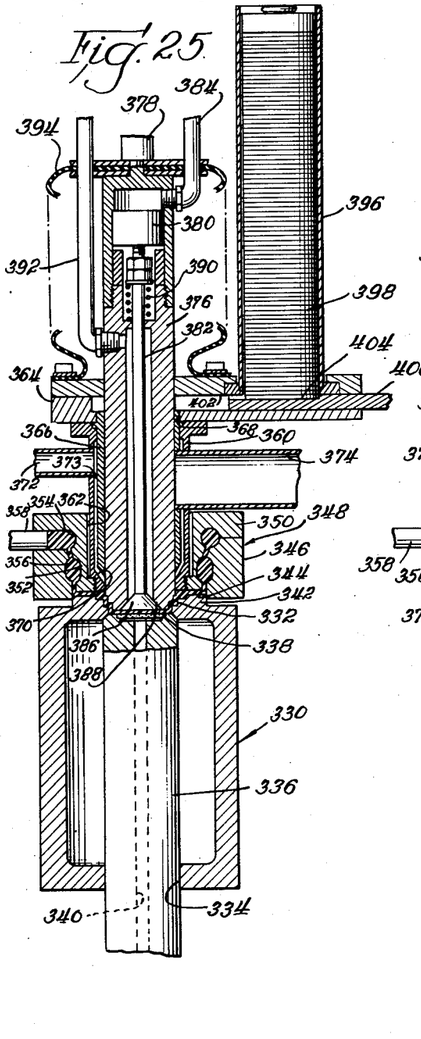
FIG. 25 is a sectional elevation view showing still another form of apparatus for practicing the method of the invention.

Referring now more particularly to FIG. 25, the numeral 330 identifies a molding die of the split type formed to provide an opening 332 in an upper surface, which opening defines in part a neck portion of a bottle to be molded, and an opening 334 formed in the lower surface of the die for slidably receiving a plunger 336. The plunger, in upper-most position, is arranged to seatingly engage the lower edge of the opening 332. The upper end of the plunger 336 is recessed to contain a porous disc 338. A passageway means 340 is provided in the plunger 336, the upper end of the passageway opening onto the recess containing the disc 338, while the lower end of the passageway is served by a pipe, or tube means (not shown) to provide a sub-atmospheric, or vacuum pressure on the lower side of the disc 338. Means (not shown) are arranged to provide reciprocal movement to the molding die 330 to control injecting of plastic material into the molding die, and will be more clearly seen hereinafter. The upper surface of the molding die is formed to provide a protrusion 342 arranged to slidingly fit an opening 344 formed in a lower die portion 346 of an injecting, or extruding die head assembly 348. The die head assembly 348 includes an upper die portion 350 having a cylindrical projection 352 extending downwardly in spaced relation to the opening 344. The die portions 346 and 350 are formed to provide circular passageways 354 and 356, passageway 354 being served by a pipe, or tube means 358 for conducting molten plastic thereto, while passageway 356 is arranged for connection at the upper end with the passageway 354 and at the lower end with the region below the cylindrical projection 352.

A flanged tube, or sleeve 360 extends into an opening 362 formed in the upper die portion 350, and is affixed therein at the lower end, while the upper end of the tube 360 is secured to a platform assembly 364. A sleeve 366 is secured at its upper end within an opening 368 formed in the platform assembly 364, and extends downwardly within the flanged tube 360 and in spaced relation thereto. The lower end of the sleeve 366 is tapered and in spaced relation to a tapered surface 370 formed in the lower end of the flanged tube 360. A pipe, or tube 372 is arranged for opening into a space 373 between the flanged tube 360 and the sleeve 366. A pipe, or tube 374, extending through the flanged tube 360 and the sleeve 366, is arranged for conducting a liquid product into a molded bottle formed in the molding die.

A mandrel, or mandrel assembly 376, affixed to a shaft 378 which is reciprocally movable by motor means (not shown), extends downwardly through the platform assembly 364, and is slidably arranged in the sleeve 366. The lower end of the mandrel assembly is recessed so that when the mandrel assembly is in spaced relation to the opening 332 of the molding die, a shouldered neck portion of a bottle may be formed, as illustrated in FIG. 25. It is to be noted that when the mandrel is in such lower position, it will be spaced from the surface of the porous disc 338 so that a closed end of a parison may be formed, which parison will be integral with the bottle neck portion. The mandrel assembly includes a piston 380 slidably arranged within the upper end, which piston is connected to a valve rod 382. A pipe, or tube 384 is arranged to conduct pressure fluid to the region above the upper end of the piston 380 whereby the piston will be moved downwardly to unseat a valve head 386, formed on the lower end of the valve rod 382, from seated engagement with a valve seat 388 formed within the lower end of the mandrel 376. A compression spring means 390 is arranged to urge the valve rod 382 upwardly whereby the valve head 386 will be seated when pressure fluid, applied to the piston via the pipe 384, is insufficient to overcome the expansive force of the spring means. A pipe, or tube 392 affixed at one end to the mandrel 376, is adapted to conduct a pressure fluid, such as compressed air, into the mandrel to flow downwardly about the valve 382 and past the valve head 386 when the latter is unseated. A bellows type sealing means 394 surrounds the upper end of the mandrel assembly, one end of the sealing means 394 being hermetically secured to the end of the mandrel, the other end thereof being hermetically secured to the platform assembly 364. In such manner, the upper part of the mandrel assembly 376, is protected against contamination by bacteria, or dirt in the atmosphere, during bottle forming and capping operations.

A tube 396, adapted to contain a supply of bottle caps 398, is affixed to the platform assembly 374, the lower end of said tube 396 opening onto a cap feed finger 400 slidably arranged in a slot 402 in the platform assembly 364. The cap feed finger 400 has a recess 404 adapted to receive one of the caps 398, while a motive means (not shown) is arranged to move the feed finger inwardly so that the bottle cap carried in the recess 404 will be positioned concentric with the axis of the sleeve 366.

Figure 26:
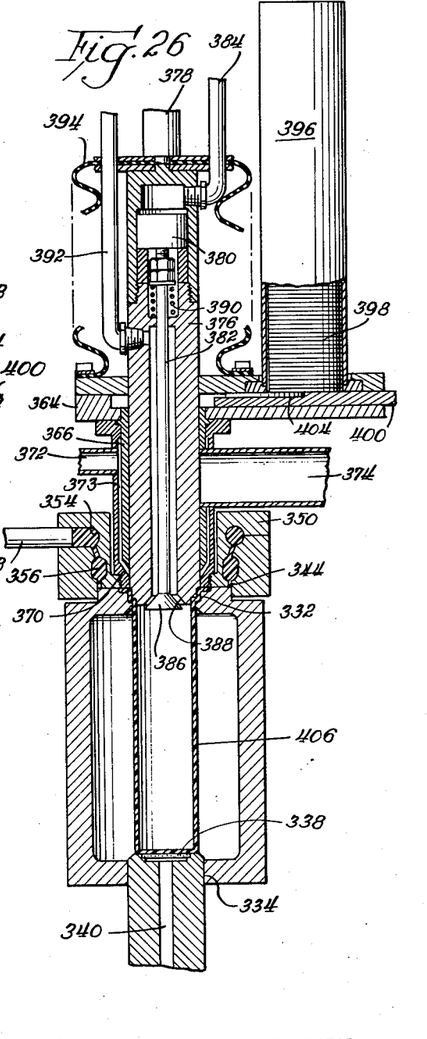
FIG. 26 is the same as FIG. 25 but showing the relative position of the various parts upon completion of molding a closed end parison.
Figure 27:
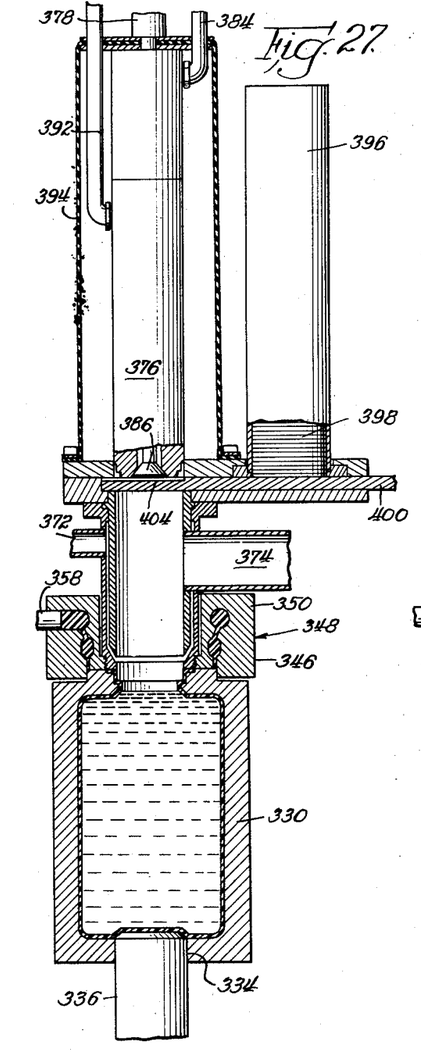
FIG. 27 is the same as FIG. 25 but showing the relative position of various parts during a filling operation.

The operation of the third embodiment above described for practicing the method of the invention will now be discussed. Referring to FIG. 25, it will be seen that the molding die 330 has been placed in position beneath the injecting head 348, and plastic material under pressure has been injected into the space provided between the end of the plunger 336, and the mandrel assembly 376, to form a shouldered bottle neck portion. Upon completion of this phase of operation, the plunger 336 is moved downwardly and an elongated wall, closed end parison 406, is drawn. The sub-atmospheric, or vacuum pressure condition on the bottom of the closed end parison, assists in the drawing thereof. During such drawing operation molten plastic material in fed into the neck portion and passes therethrough so that the drawn parison is integral with the molded neck portion. When the parison is fully drawn, as illustrated in FIG. 26, the molding die assembly is moved upwardly so that the protrusion 342 seats against the bottom of the molding die projection 352, thus cutting off flow of molten plastic material into the neck portion of the bottle. The cycling mechanism of the apparatus, which is not shown, next initiates flow of pressure fluid whereby the piston 380 is moved downwardly to unseat the valve head 386, and allow flow of compressed air into the parison to expand the wall thereof into engagement with the cavity of the molding die.

Upon completion of the bottle molding, the cycling mechanism of the apparatus initiates the release of fluid pressure upon the piston 380, whereby the spring 390 forces the piston upwardly so that the valve head 386 seats upon the mandrel valve seat 388. Next, the cycling mechanism of the apparatus initiates upward movement of the mandrel assembly, such upward movement terminating when the lower end thereof clears the slot 402. The cap feed finger 400 is next moved inwardly so that the bottle cap is placed in the center of the sleeve 366. At this point, the cycling mechanism of the apparatus operates to cause a slight unseating of the valve head 386, and a sub-atmospheric or vacuum pressure in pipe 392, causes a pressure differential to be exerted on the bottle cap to hold it against the lower end of the mandrel 376. During positioning of the bottle cap, as described, the cycling mechanism of the apparatus initiates flow of a liquid product in the pipe 374, which product flows downwardly within the sleeve 366 to fill the blown bottle. Means (not shown) to meter the flow of such liquid to prevent over-filling are provided. It is to be noted that during the filling of the bottle the air therein will be vented through the pipe 372.

Figure 28:
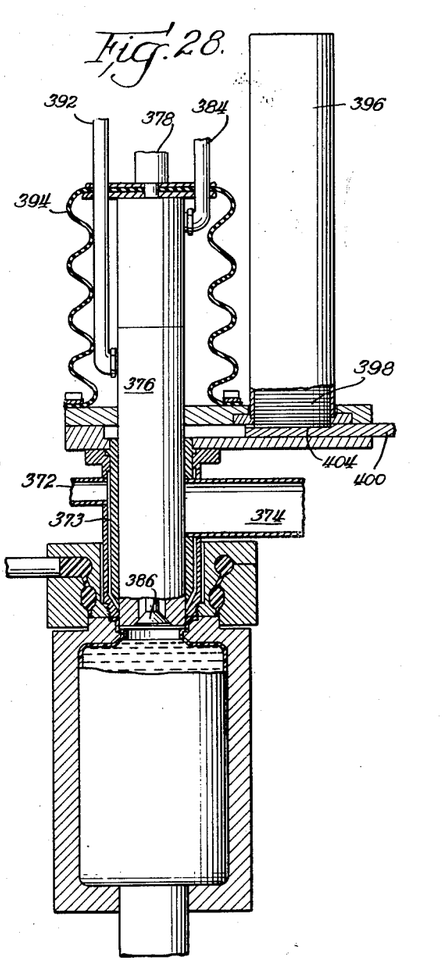
FIG. 28 is the same as FIG. 25 but showing the relative position of the various parts at the time of capping a filled bottle.

After the blown bottle has been filled to a predetermined level, the cycling mechanism of the apparatus initiates downward movement of the mandrel assembly 376 to cause seating of the bottle cap 398 within the shouldered opening of the formed bottle, as seen in FIG. 28. All that remains after the bottle has been capped is for the molding die to be moved downward from engagement with the injecting die, and to be opened for removal of the molded, filled, and capped bottle.

While the molding die 330 has been described as the movable element for control of plastic flow into the die, obviously, the injecting die assembly 348 may be made movable to achieve material flow control. In addition, it is reasonable to assume that the apparatus cycling means for providing the timed sequence necessary for bottle molding, blowing, filling and capping as above described, may be readily designed, and would pose no serious problem for those skilled in the art of thermoplastic blow molding apparatus.

No specific mention has been made of the type of plastic material usable in the practice of the method of the invention, however, it is to be understood that any organic material having the necessary degree of elasticity, and adapted to be used for blow molding plastic bottles, such as normally solid polyolefins, particularly polyethylene, polypropylene, copolymers of ethylene and propylene and the like, polystyrene and similar alkenyl aromatic resins and rubber modified variations thereof, vinyl chloride polymers, nylon and so forth, may be satisfactory.

It should now be apparent that the method of the invention as disclosed above, and the various embodiments described for utilization of said method, will provide highly efficient and economical means for making, filling, and capping thermoplastic bottles, where the entire operation may take place in a single machine, and without the need for removing the bottle from the molding die until after it is formed, filled, and capped.

The foregoing description has been given in detail without thought of limitation since the invention principles involved are capable of assuming other forms without departing from the spirit of the invention or the scope of the following claims.

What is claimed is:

1. An assemblage for blow molding, filling, and capping a thermoplastic bottle comprising, a molding die having a cavity, an extruding head including a mandrel means, said molding die being positioned adjacent the extruding die and being formed with an opening which receives said mandrel means in spaced relation, a plunger slidably arranged in the molding die and adapted to seat upon an inner edge of said opening, said extruding die being arranged to inject a plastic material into the molding die opening and about said mandrel to form a neck portion of a bottle and to continue such injecting while the plunger is being moved away from said opening to form a closed bottom parison having an elongated wall, means to cutoff flow of plastic material into said opening after the parison has been formed, means to establish a pressure differential upon the wall of the parison to force it into engagement with the wall of the molding die cavity, means to fill the molded bottle with a liquid product, and means to cap the liquid filled bottle.

2. An assemblage according to claim 1, wherein the end of said plunger which seats upon the inner edge of the molding die opening is formed to provide a sub-atmospheric pressure area.

3. An assemblage for blow molding, filling, and capping a thermoplastic bottle comprising, a split type molding die formed to provide a cavity and an opening at one end which leads into said cavity, a plunger slidably arranged in said molding die and adapted to seat on an inner edge of said opening, an extruding die including a lower portion and an upper portion, said portions being formed to provide a cylindrical opening, a sleeve member slidably arranged in said upper portion, a bushing positioned within said sleeve member, a tube arranged within said bushing and in spaced relation thereto the lower end of which forms a mandrel projecting into the molding die opening, a valve arranged in said tube and in spaced relation to the inner wall thereof, said valve being adapted to engage a valve seat formed in the end of said tube, means to admit pressurized plastic material into the cylindrical opening for flow into the molding die opening to form the neck portion of a bottle and to continue such flow as the plunger is moved away from engagement with the edge of said molding die opening to form a closed end parison surrounding said sleeve member being movable to shut off flow of plastic material into said molding die opening, means to admit a pressurized medium about the tube to expand the wall of said parison into engagement with the cavity, said valve being movable from engagement with said valve seat to allow flow of a liquid product through the tube and into said bottle for filling the bottle, and means to seat a bottle cap in the neck portion of the filled bottle.

4. An assemblage for blow molding, filling, and capping a thermoplastic bottle according to claim 3, wherein the means for seating the bottle cap includes a finger means arranged for positioning a bottle cap within the bushing where it is engaged by the end of the tube and lowered into seated position in the neck portion of the bottle.

5. An assemblage for blow molding and filling a thermoplastic bottle comprising, a split type molding die formed to provide a cavity and an opening at one end which leads into said cavity, a plunger slidably arranged in said molding die and adapted to seat on an inner edge of said opening, an extruding die including a lower portion and an upper portion which portions are formed to provide a cylindrical opening, said molding die being movable into engagement with said extruding die, a sleeve valve slidably arranged in said upper portion, a mandrel assembly positioned within said sleeve valve the lower end of said mandrel assembly projecting into the molding die opening and in spaced relation with the walls thereof, a flow control valve arranged in said mandrel assembly and adapted to engage a valve seat formed in the lower end thereof, said mandrel assembly being formed to provide passageway means whereby a cooling medium is circulated through the mandrel assembly and within the lower end thereof, said molding die being formed to provide passageway means whereby a cooling medium is circulated therethrough and in the region of the molding die opening, means to admit pressurized plastic material into said cylindrical opening for flow into the molding die opening to form the neck portion of a bottle and to continue such flow as the plunger is moved away from engagement with the edge of said molding die opening to form a closed end parison, said sleeve valve being movable to shut off flow of plastic material in the molding die opening, said flow control valve being movable from engagement with said valve seat to allow flow of pressurized medium into the formed parison to expand the wall thereof into engagement with the walls of said cavity, said valve being unseated after parison blowing to allow flow of a liquid product into the blown parison.

6. An assemblage according to claim 5, wherein said plunger is formed to provide a passageway means whereby a sub-atmospheric pressure area may be created on the end of the plunger which seats upon the edge of the molding die opening.

7. An assemblage according to claim 6, wherein means are provided to move said molding die into engagement with the extruding die, and to lock said molding die in engagement with the extruding die.

8. An assemblage for blow molding, filling, and capping a thermoplastic bottle comprising, a split type molding die formed to provide a cavity and an opening at one end which leads into said cavity, a plunger slidably arranged in said molding die and adapted to seat on an inner edge of said opening, an extruding die including a lower die portion and an upper die portion and formed with a circular passageway opening at the lower surface of the extruding die, a flanged tube secured within an opening formed in said extruding die, a sleeve positioned within the flanged tube and in spaced relation thereto, a mandrel assembly slidably arranged in said sleeve, the lower end of said mandrel assembly projecting into the molding die opening and in spaced relation with the walls thereof, a flow control valve arranged in the mandrel assembly and adapted to engage a valve seat formed in the lower end thereof, said molding die being arranged for selective engaging movement with the extruding die, means to admit pressurized plastic material into the circumferential opening for flow into the molding die opening to form the neck portion of a bottle and to continue such flow as the plunger is moved away from engagement with the edge of said molding die opening to form a closed end parison, said flow control valve being movable from engagement with said valve seat to allow flow of pressurized medium into the parison to expand the wall thereof into engagement with the walls of said cavity, a sealing means to hermetically seal the upper end of said mandrel assembly from the atmosphere, means to fill the molded bottle with a liquid product, and means to cap the liquid filled bottle.

References Cited by the Examiner

UNITED STATES PATENTS 2,230,188 1/41 Ferngren _______________ 264—98
3,016,669 1/62 Grosclaude _____________ 53—29 X
3,027,596 4/62 Knowles _______________ 18—21 X FRANK E. BAILEY, *Primary Examiner.*

WHITMORE A. WILTZ, *Examiner.*

UNITED STATES PATENT OFFICE
CERTIFICATE OF CORRECTION

Patent No. 3,196,592                                                             July 27, 1965

Grant W. Cheney

It is hereby certified that error appears in the above numbered patent requiring correction and that the said Letters Patent should read as corrected below.

Column 12, line 58, after "said" insert -- tube, said --.

Signed and sealed this 21st day of June 1966.

(SEAL)
Attest:

ERNEST W. SWIDER                                            EDWARD J. BRENNER
Attesting Officer                                                  Commissioner of Patents